Patented Aug. 4, 1953

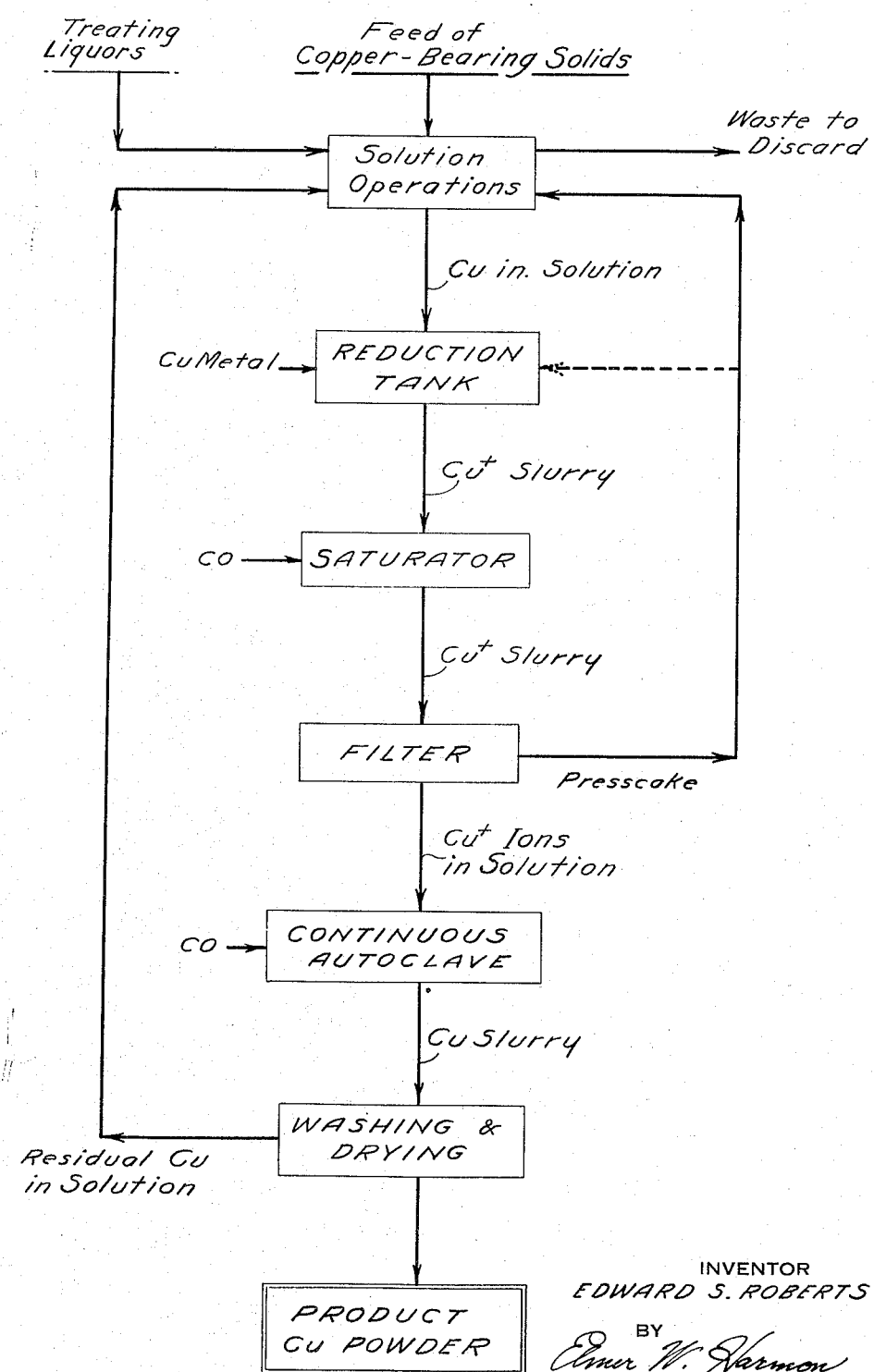

2,647,825

UNITED STATES PATENT OFFICE 2,647,825

PRECIPITATION OF PURE METALLIC COPPER FROM COPPER-BEARING SOLUTIONS

Edward S. Roberts, New York, N. Y., assignor to Chemical Construction Corporation, New York, N. Y., a corporation of Delaware Application April 8, 1949, Serial No. 86,156

11 Claims. (Cl. 75—0.5)

This invention relates to a process for the precipitation of copper metal powder of very high purity. More particularly, the invention is concerned with an improved continuous process for the precipitation at elevated temperatures and pressures of copper metal powder from aqueous solutions of copper salts.

The present invention constitutes a continuation-in-part of my copending application with Samuel Strelzoff and William H. Baxter, Serial No. 661,502, filed April 12, 1946, now abandoned, entitled "Method for the Production of Copper."

Many processes have been suggested by which copper metal may be recovered from copper ores, low-grade copper, or other copper sources, by chemical treatment. All of these proposals, in addition to mechanical concentration, involve at least two broad chemical unit processes. In the first, the object is to separate the valuable metals from waste materials, by dissolving the former in an aqueous solution, and then separating that solution, by mechanical means, from the waste solids. In the present discussion, this unit process will be referred to as the "dissolving" or "solution" operation. In the second of these, the object is to extract the metal values from the solutions so produced and to obtain these metals in commercially desirable form. In the present discussion, this unit operation will be referred to as the "precipitation" and/or "reduction" operation.

The copper solutions to be treated may be obtained industrially in a number of different ways. They may constitute copper mine waters, heap leaching solutions and the like. They may arise from ammoniacal leaching of oxide or carbonate ores, native copper-bearing ores, or secondary scrap materials. They may arise from acid leaching of oxide, carbonate, or sulfide copper ores, or other products containing available copper.

In the process of the present invention, only the "precipitating" operations are specifically dealt with. Since the invention is not concerned with how copper is placed in solution as copper salts, the dissolving procedure will be referred to, generically, as noted above, as "solution operations."

The present invention is not concerned with their efficiency or lack of it, since no matter how satisfactory such an operation may be, it is of little practical value if the copper content of the solution cannot be efficiently and economically recovered. Unfortunately, all the previously proposed precipitating operations have suffered from one or more defects.

In the present copper industry, only one method of extracting pure copper metal from solutions of its salts has been industrially developed to any particular extent. This is the electrowinning of copper through the use of insoluble anodes. This method, however, can be used only in connection with large and permanent leaching installations. Even when electrodeposition is used, the copper cathodes so obtained must be further refined in fusion operations and cast into bars before it is marketable.

This type of operation, however, has resulted in setting the purity standard for commercial copper. Copper, to be industrially acceptable, must meet so-called "electrolytic" standards, i. e., the copper content, plus the minor silver content, must be at least 99.9% by weight.

Commercially, previously proposed methods of chemical precipitation have failed in that they cannot produce precipitated copper of this requisite degree of purity. It is, therefore, the principal object of the present invention to develop a precipitation procedure not subject to these objections. A process in accordance with the objects of the present invention should be capable not only of producing copper in the requisite grade but should, in addition, be capable of producing the copper in efficient recovery.

Surprisingly, in view of the ineffectiveness of previously-known proposals, these objects have been fully met in a straightforward precipitating process. Briefly, the process incorporates (1) reduction of copper ions in solution to the cuprous condition by saturating the solution with carbon monoxide at low temperatures and low or atmospheric pressures in the presence of copper metal; (2) removal of suspended matter and dissolved impurities; and (3) treatment of the saturated, clarified solution at increased temperature and pressure in the presence of an atmosphere containing reducing gas. Care is taken to precipitate only a part of the available copper. All unprecipitated copper is recycled.

In the accompanying drawing, there is shown a flow sheet which, it is believed, will assist in understanding the description of the process of the present invention. The flow sheet sets forth diagrammatically the principal operations of the present invention.

It is an advantage of the precipitating procedure of the present process that it is applicable to solutions of copper salts obtained by any desired process. They may include any of the operations listed above. Such operations form no part of the present invention. Accordingly, dissolving the copper is indicated on the flow sheet broadly as "Solution Operations."

Feed to the solution operation is indicated as containing copper-bearing solids. Usually it will consist of low-grade copper, which requires further purification; and/or an ore of copper-bearing minerals. In the latter case, it is ordinarily uneconomical to treat ore as mined. Usually it will be pre-concentrated, as by washing, flotation, gravity separation, or the like. These pre-concentration operations also constitute known arts and form no part of the present invention.

Although, as noted above, the particular nature of the "solution operations" forms no part of the present process, they have been indicated on the flow sheet. This is necessary because the process involves a certain amount of recirculation. The feed, whatever its nature, is treated by some known method to produce a solution containing copper ions.

In most such solution operations, only a part of the material being treated is soluble. There will be a residue which ordinarily is waste material, or gangue, so far as the solution is concerned. This material may be treated in other processes, if so desired. However, so far as the present invention is concerned, they are simply removed from the circuit. This may be done by filtration, settling, or any other desirable procedure. Since its exact nature forms no part of the present invention, this mechanical separation of the solution from extraneous waste material is considered to be part of the procedure designated on the flow sheet as "Solution Operations."

Clarified solution so obtained is given the first actual treatment of the present invention. This is a reduction of copper to cuprous ions, carried out in some suitable tank or tanks with copper metal and carbon monoxide. This treatment is highly important in the success of the present process. If it is omitted, production is unreliable both in quantity and quality. Without this treatment, results differ in successive runs, wherein conditions otherwise appear to be the same. Use of this simple operation not only insures good but consistent results.

Most plants usually have available a source of low-grade copper metal. Preferably in comminuted form, it may be a recovery product, such as cement copper, or the like; or simply scrap from other operations. It need not be low-grade. Operation of the present process should not be confused with earlier processes in which copper metal is dissolved and a portion thereof precipitated in higher purity. That operation can never precipitate as much copper as is dissolved. In the present process, copper metal is used as a reducing agent in treating dissolved copper. Eventually all dissolved copper is precipitated in high purity in this invention.

Clarified solution is mixed with the metal and saturated. The treating temperature should be low, i. e., from room temperature to about 100° C. to insure the gas solubility. Ordinarily, liquor to be treated will be at a temperature below about 50° C. Gas is ordinarily fed under just sufficient pressure to meet flow resistance. However, when an ammonia-containing leach liquor is used, higher pressures, up to about 100 pounds gauge, may be required to complete saturation.

Treatment is carried out in any suitable vessel or vessels. As shown, saturating is done in a separate vessel from the admixture with copper metal. Some time may elapse between the addition of the metal and of the gas. Thus, two tanks are shown to simplify the description and because their use may simplify operation in some cases, particularly if saturation is done under increased pressure. However, both operations may be done successively or simultaneously in one vessel.

The resultant saturated slurry is now a composite mixture. It comprises undissolved copper metal and the assorted fluids. Of the latter, the solution of copper as cuprous ions is of primary importance. This slurry is then filtered, both the presscake and filtrate being subsequently and separately treated.

Ordinarily, the presscake is directly returned to the "Solution Operations," to recycle its copper content. It may contain a considerable quantity of unused copper metal. If so, all or a part may be recycled to the reduction operation. However, this is an optional procedure. Therefore, it is indicated by a dotted line on the flow sheet.

Continuing with the illustrative case, solution which is saturated with carbon monoxide is then treated to precipitate a part of its copper content. This is carried out in an autoclave, preferably of the continuous type, in which increased temperature and pressure is applied. Treatment conditions will vary somewhat, depending upon whether copper or copper-ammonium ions are present.

In either case, operable temperatures may be substantially the same. Generally, they should be above 100° C., and may range up to as high as 275° C., or slightly above. However, for different solution operations, there are preferable temperature ranges. In the case of copper-ammonium ions, excessive temperature at low pressure favors precipitation of copper oxide and/or sulfide. With ammoniacal liquors a good practice is to utilize a temperature of from about 110°–150° C. Somewhat higher temperatures are preferable in treating acid liquors. In this case, a range of from about 200°–300° C. appears to constitute the optimum.

In treatment of saturated solutions, the pressure chosen also is subject to certain considerations. Pressures excessively above those necessary at the operating temperature perform no useful function. Since they require heavier apparatus, they should be avoided. In the case of acid leaching liquors, the utilizable pressure range is from about 75 to 1000 pounds. For the preferred temperatures, however, this pressure range will be from about 225–425 pounds. For ammoniacal leach liquors, however, or for solutions containing extraneous gases, pressures from 300–700 pounds higher than those otherwise used may be found desirable. Because of the variance in partial pressure of the ammonia, a good average practice with ammoniacal liquors will generally lie between 150–750 pounds.

Operation of the process of the present invention will be more fully illustrated in conjunction with the following examples. The latter are given as illustrative only and not necessarily by way of limitation. Except as otherwise noted, all figures expressed in percent are by weight.

*Example 1*

To illustrate the treatment of copper solutions obtained by ammoniacal leaching, the following experiment was performed. An impure copper was leached with a liquor containing approximately 55.5 mols of water, 3.03 mols of $CO_2$, 6.56 mols of ammonia and 1.21 mols of copper. Leaching was carried out until a gravity of about 1.22 was reached, corresponding to the addition to the liquor of about 0.48 mol of copper and 0.41 mol of oxygen. This solution was treated with copper metal and the resultant slurry filtered. The filtrate was saturated with carbon monoxide at about 20° C. and 35 centimeters pressure and passed to an autoclave. In the latter, it was treated with carbon monoxide at about 100 pounds per square inch pressure, after which the temperature range was raised to 130° C. and held for 2 hours, the pressure rising to a maximum of about 460 pounds per square inch. The treated product was cooled, pressure relieved and the precipitated copper metal filtered out, surface treated by boiling in sulfuric acid, dried, and analyzed.

About 28.4% of the copper entering the autoclave was precipitated as powder, having an extraordinarily high purity of 99.99%. The remaining liquor was recirculated to the leaching operation.

*Example 2*

The procedure of Example 1 was repeated, using precipitation temperatures ranging from 125°–150° C. and pressures from 150–750 pounds per square inch. In each case, products were obtained which amounted to 22–28% of the copper content of the liquor after leaching. In each case, analysis of the product showed a copper content of 99.94%–99.99%.

It should be noted that in the above treatments the product powder, after washing, was boiled with sulfuric acid to prevent reoxidation.

*Example 3*

As illustrative of the application of the present invention to the precipitation of copper from acid solutions, the following experiments were carried out.

A flotation concentrate containing oxidized copper minerals, copper sulfide minerals and iron sulfide minerals was subjected to oxidation at 225° C. and 600 pounds per square inch in the presence of ferric sulfate to obtain a solution of copper and ferric sulfates. Copper sulfate was separated by crystallization and redissolved in water. Samples of this solution, containing about 8% copper sulfate, were subjected to the following operations, carried out on successive portions.

A liquid portion was agitated in a closed tank with copper metal and carbon monoxide until dissolved copper was in the cuprous condition. The resultant slurry was filtered and the filtrate passed to an autoclave, treated at about 400 pounds per square inch with carbon monoxide and the temperature raised to about 215° C., the pressure reaching about 520 pounds per square inch gauge. Temperature and pressure were maintained for sufficient time to precipitate about 60% of the available copper, the charge being then cooled and filtered, the filtered powder being collected, boiled with sulfuric acid, washed and dried.

The first portion so treated was found to yield about 62.2% of the available copper in a product analyzing 99.95% pure copper. Repeating the experiment on successive portions, at temperatures from 200°–275° C. showed that temperatures above about 250° C. were not desirable and that above about 300° C. were impractical. In the temperature range from 200°–250° C. and a total pressure of 300–700 pounds per square inch, of which the partial pressure of the reducing gas is ordinarily about 100–150 pounds per square inch, from 60–75% of the available copper was precipitated in grades analyzing 99.94%–99.99% copper.

The extent to which precipitation is carried out is a critical limitation. It will depend, however, to some extent, on the nature of the liquor being treated. This is shown in the above examples.

Using an ammoniacal leach in the "solution operations," it is desirable to return thereto a considerable portion of the copper available for precipitation in the autoclave. This is necessary to provide copper-ammonium complex in the leach liquor. Experience has shown that precipitation of about 20–30% of the available copper entering the autoclave is good practice. Within this range in any one cycle, about 95–105% of the copper taken up during leaching is precipitated in a degree of purity exceeding 99.94%, i. e., well above the minimum copper content required to meet electrolytic standards. The remainder is recycled. For a series of cycles the total amount of precipitated copper will substantially balance the total amount dissolved during leaching.

In precipitating from solutions obtained when the "solution operations" involve acid leaching and/or acid-oxidation treatment or the like, the circulating load of copper may be much less. There is no necessity for recirculating any copper ions for the sake of the leaching operation.

However, experience has shown that for this type of operation, a good practice is to precipitate only 60–70% of the copper entering the autoclave. While it is obviously impossible to go much below 60%, it is not economical to do so. In many cases, particularly in batch operations, it is possible to exceed the 70% limitation for certain conditions. However, the solution to be treated will seldom have a solute content of only pure copper salts. Therefore, exceeding the 70% limit increases the likelihood of precipitating extraneous materials with the copper; and therefore, adversely affecting the quality of the product. Actually, there is no loss, since all unprecipitated copper may be recirculated. It is, therefore, preferable that precipitation be not carried above about the 70% limitation.

I claim:

1. In the process of recovering copper in high purity from solid copper-bearing material wherein said material is treated by "solution operations" to obtain a solution containing cupric and cuprous ions and copper metal is chemically precipitated from resultant solution, the improvement which comprises: contacting additional copper metal with said solution and at below 100° C., substantially saturating the liquid with carbon monoxide, whereby additional copper is introduced into solution with a concurrent equivalent reduction of cupric to cuprous ions; subjecting so-treated liquor, at a pressure of from about 75 to about 1000 pounds per square inch and at least sufficient to prevent boiling of the solution and under an atmosphere comprising carbon monoxide to a temperature above 100° C., but not more than 150° C. for ammoniacal liquors and 300° C. for acid liquors, for sufficient time to precipitate at least an amount of copper metal powder greater than that dissolved in reducing cupric to cuprous ions, but not more than so much as is at least 99.9% copper; collecting precipitated copper and recirculating residual copper to the "solution operations."

2. In the process of recovering copper in high purity from solid copper-bearing material wherein said material is treated by "solution operations" to obtain a solution containing cupric and cuprous ions and copper metal is chemically precipitated from resultant solution, the improvement which comprises: contacting said solution with additional copper metal in amount at least stoichiometrically equivalent to a major portion of the cupric ions in solution and at below about 100° C., substantially saturating the liquor with carbon monoxide, whereby additional copper is introduced into solution with a concurrent equivalent reduction of cupric to cuprous ions; subjecting so-treated liquor, at increased pressure at least sufficient to prevent boiling of the solution, and under an atmosphere comprising carbon monoxide, to a temperature above about 100° C., but not more than about 150° C. for ammoniacal liquors and 300° C. for acid liquors, for sufficient time to precipitate more copper than dissolved in the cupric-cuprous reduction step, but not more than is at least 99.9% pure copper; collecting precipitated copper and recirculating residual copper to the "solution operations."

3. A process according to claim 2 wherein the "solution operations" involve producing copper-ammonium ions in ammoniacal liquor, further characterized in that the precipitation of copper metal powder is carried out at from about 110° C. to about 150° C. for sufficient time to precipitate only so much metal powder as is at least 99.9% pure copper.

4. A process according to claim 3 wherein the pressure during metal powder precipitation is from about 150 to about 750 pounds per square inch.

5. A process according to claim 3 in which about 20-30% of the available copper is precipitated.

6. A process according to claim 2 wherein the "solution operations" produce copper ions in an acid solution of copper sulfate, further characterized in that the precipitation of copper metal powder is carried out at a temperature of about 200° C. to about 300° C., for sufficient time to precipitate only so much metal powder as is at least 99.9% pure copper.

7. A process according to claim 6 wherein the pressure during reduction is from about 225 to about 425 pounds per square inch.

8. A process according to claim 6, in which from about 60-75% of the available copper is precipitated.

9. In a process for the preparation of copper metal powder by treatment with carbon monoxide of a solution containing copper ions, the improvement which consists in: treating the solution with copper metals to substantially reduce any cupric content to cuprous and substantially saturating the liquor with carbon monoxide at a temperature below about 100° C. and subjecting the so-treated liquor at a temperature from about 110° C. to about 300° C. under increased pressure, in an atmosphere comprising CO, for such time as is sufficient to precipitate more copper than said treating copper, but only copper having a purity of at least 99.9% and collecting precipitated copper.

10. In a process for the preparation of copper metal powder by treatment with carbon monoxide of a solution containing copper ions, the improvement which consists in: subjecting a solution containing cupric and cuprous ions and substantially saturated with carbon monoxide to treatment with copper metal to substantially reduce the cupric content to cuprous, and then to a temperature from about 110° C. to about 300° C., and under superatmospheric pressure, for such time as is sufficient to precipitate more copper metal than said treating copper, but only copper having a purity of at least 99.9%, and collecting precipitated copper.

11. In a process for the preparation of copper metal powder by treatment with carbon monoxide of a solution containing copper ions, the improvement which consists in: subjecting said solution containing cupric and cuprous ions after it is treated with copper metal to substantially reduce the cupric content to cuprous, and substantially saturated with carbon monoxide, to a temperature from about 110° C. to about 300° C. and under pressure of from about 75 to about 1000 pounds per square inch, for such time as is sufficient to precipitate more copper than said treating copper, but only copper having a purity of at least 99.9%, and collecting precipitated copper.

EDWARD S. ROBERTS.

References Cited in the file of this patent

UNITED STATES PATENTS

| Number | Name | Date |
|---|---|---|
| 924,076 | Jumau | June 8, 1909 |
| 1,686,391 | Muller et al. | Oct. 2, 1928 |
| 1,763,781 | Heath et al. | June 17, 1930 |
| 2,008,373 | Tobelmann | July 16, 1935 |
| 2,227,783 | Klumpp | Jan. 7, 1941 |
| 2,290,313 | Caron | July 21, 1942 |

FOREIGN PATENTS

| Number | Country | Date |
|---|---|---|
| 24,163 | Great Britain | of 1911 |

OTHER REFERENCES

A Comprehensive Treatise on Inorganic and Theoretical Chemistry, vol. 3, pages 158 and 232, edited by Mellor, published in 1923 by Longmans, Green and Co., London, England.